United States Patent
Huh

[11] Patent Number: 5,813,427
[45] Date of Patent: Sep. 29, 1998

[54] COUNTER-CURRENT CHECK DEVICE FOR A CANISTER IN AN AUTOMOBILE

[75] Inventor: Kyung Sun Huh, Kyungkido, Rep. of Korea

[73] Assignee: Hyundai Motor Company, Seoul, Rep. of Korea

[21] Appl. No.: 760,162

[22] Filed: Dec. 3, 1996

[30] Foreign Application Priority Data

Dec. 4, 1995 [KR] Rep. of Korea ................. 1995-46401

[51] Int. Cl.⁶ ........................................... F16T 1/20
[52] U.S. Cl. .................... 137/202; 137/529; 123/198 D; 123/520
[58] Field of Search ................... 137/529, 202; 123/520, 198 D

[56] References Cited

U.S. PATENT DOCUMENTS

| | | | |
|---|---|---|---|
| 5,082,016 | 1/1992 | Nakamura | 137/202 |
| 5,172,714 | 12/1992 | Kobayashi | 137/202 |
| 5,427,076 | 6/1995 | Kobayashi | 123/520 |
| 5,450,833 | 9/1995 | Denz | 123/520 |
| 5,488,936 | 2/1996 | Rychlick et al. | 123/520 |
| 5,553,577 | 9/1996 | Denz | 123/198 D |
| 5,598,870 | 2/1997 | Nagino | 137/202 |
| 5,601,065 | 2/1997 | Tamura | 123/198 D |
| 5,605,175 | 2/1997 | Bergsma | 137/202 |
| 5,666,924 | 9/1997 | Kadota | 123/198 D |

FOREIGN PATENT DOCUMENTS 71665  1/1943  Germany ................................ 137/529

*Primary Examiner*—Denise L. Ferensic
*Assistant Examiner*—Ramyar Farid
*Attorney, Agent, or Firm*—Christie, Parker & Hale, LLP

[57] ABSTRACT

A device for preventing a fluid from flowing in a canister used in an automobile comprising a casing of a hollow cylindrical shape having an inlet and an outlet, the outlet being connected to a vent pipe of the canister and the inlet being connected to the atmosphere, a funnel-shaped plate having a venting port in its center and airtight-coupled to a inner surface of the casing, a bladder positioned below the funnel-shaped plate, having a gating portion fittable to the venting port of the funnel, and biasing means for urging the gating portion of the bladder against the venting port of the funnel-shaped plate.

3 Claims, 3 Drawing Sheets

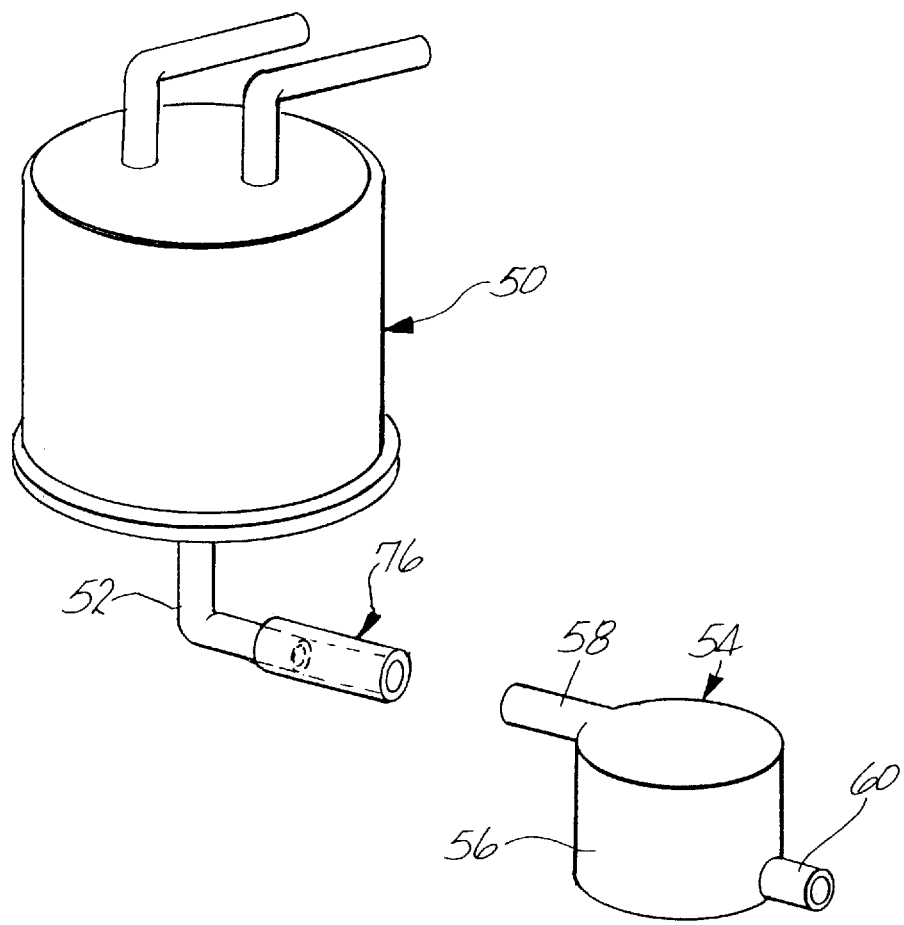

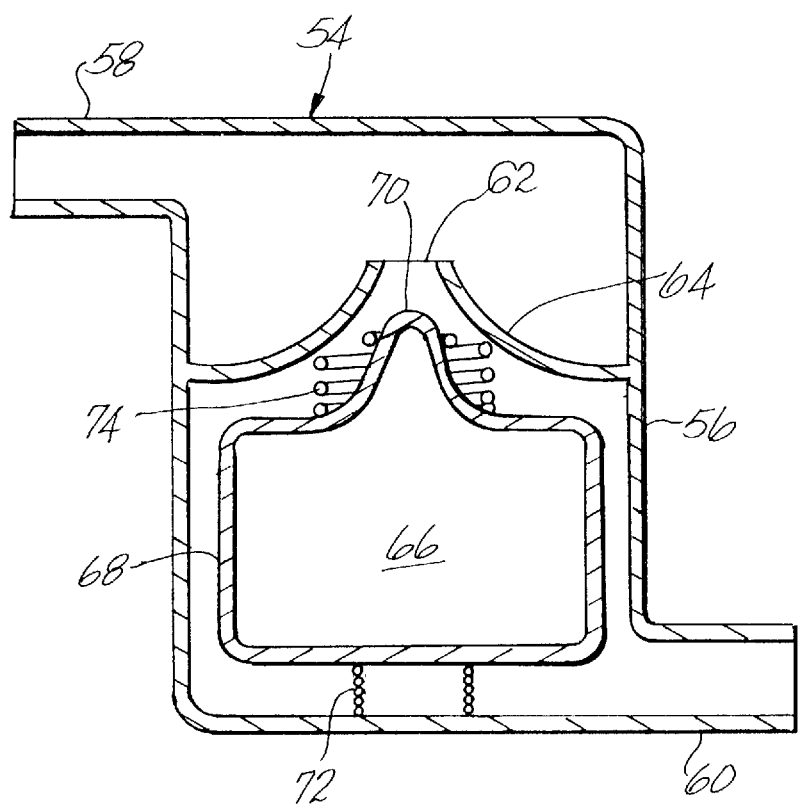

COUNTER-CURRENT CHECK DEVICE FOR A CANISTER IN AN AUTOMOBILE

FIELD OF THE INVENTION

The present invention relates to a counter-current check device, and more particularly to a device for preventing liquid from flowing into a fuel canister of an automobile.

DESCRIPTION OF THE RELATED ART

U.S. Pat. No. 5,488,936 discloses an evaporative purge flow monitoring system for use in a motor vehicle having an evaporation canister in communication with a fuel tank and an internal combustion engine for trapping and subsequently reusing fuel vapor dispelled from the fuel tank.

Referring to FIG. 1, there is illustrated a canister which is used in the evaporative purge flow monitoring system. The canister 10 includes a body 12. The body 12 is connected at its upper end with a fuel tank and an intake manifold through ducts 14 and 16, respectively, and is connected at its lower end with an atmosphere through a vent pipe 18.

However, in the canister 10 of the prior art, constructed as mentioned above, while the automobile is passing through a puddle or when a localized torrential downpour is falling, liquid can flow from the outside through the vent pipe 18 into the body 12 due to a negative pressure generated within an engine, so that the liquid may gather in the body 12. Accordingly, as the liquid gathers in the body 12, the canister 10 can lose its original function. In some cases, the liquid flowing into the body 12 streams to the engine thereby to cause a malfunction thereof. Also, when heat of the fuel tank is reduced, a problem may occur in that the liquid gathered in the body 12 can flow into the fuel tank through the duct 14 in an upstream direction.

SUMMARY OF THE INVENTION

Accordingly, the present invention has been made in an effort to solve one or more of the problems occurring in the prior art, and an object of the present invention is to provide a floating type counter-current check device for preventing outside liquid from flowing into a canister.

According to one aspect of the present invention, there is provided a device for preventing liquid from flowing into a canister of an automobile, comprising: a casing of a cylindrical configuration having an inlet and an outlet, the outlet being connected to a vent pipe of the canister and the inlet being connected to an atmosphere; a funnel-shaped plate fastened to an inner surface of the casing and having a venting port formed in its center; a bladder positioned below the funnel-shaped plate and having a gating portion which can be fitted to the venting port of the funnel-shaped plate; and biasing means automatically operative when liquid from the inlet acts on the bladder, for urging the gating portion of the bladder against the venting port of the funnel-shaped plate.

According to another aspect of the present invention, the biasing means includes a pair of springs positioned above and below the bladder, respectively.

According to still another aspect of the present invention, the spring positioned below the bladder has a higher spring constant than the spring provided around the gating portion.

BRIEF DESCRIPTION OF THE DRAWINGS

The above objective, and other features and advantages of the present invention will become more apparent by describing a preferred embodiment thereof with reference to the accompanying drawings, in which:

FIG. 2 is a perspective view of a counter-current check device in accordance with an embodiment of the present invention; and FIG. 3 is a cross-sectional view of the counter-current check device shown in FIG. 2.

DETAILED DESCRIPTION OF A PREFERRED EMBODIMENT

Figure 1:
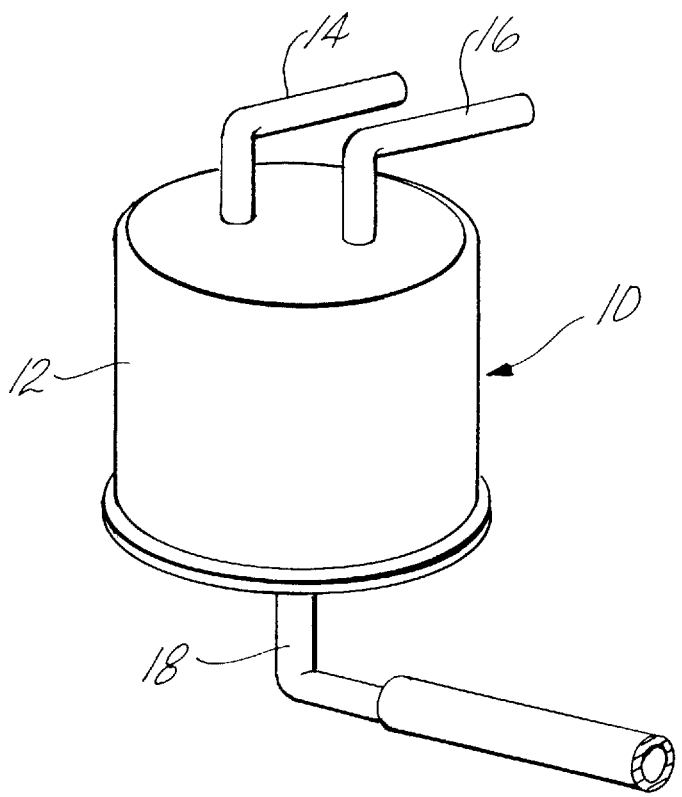
FIG. 1 is a perspective view of a canister of the prior art.

Referring now to FIGS. 2 and 3, there is shown a floating type counter-current check device for a canister in accordance with an embodiment of the present invention.

The canister 50 used in an automobile includes a body. The body is connected at its upper end with a fuel tank and an intake manifold through ducts 14,16, respectively, and is connected at its lower end with the atmosphere through a vent pipe 52.

The counter-current check device 54 of the present invention is provided at a free end of the vent pipe 52. The counter-current check device 54 includes a casing 56 having a cylindrical configuration. The casing 56 has an outlet 58 and an inlet 60. The outlet 58 is formed at an upper end of the casing 56 and is connected with the vent pipe 52 through a hose 76. The inlet 60 is formed at a lower end of the casing 56.

The counter-current check device 54 also includes a funnel-shaped plate 64 which is fastened to an inner surface of the casing 56. The funnel-shaped plate 64 has a venting port 62 formed at its center. Inside the casing 56, a bladder 68 is disposed below the funnel-shaped plate 64. A floating chamber 66 is defined in the bladder 68 to allow the bladder 68 to be biased upward when liquid flows through the inlet 60 into the casing 56 and acts on the bladder. The bladder 68 has a gating portion 70 which can be fitted to the venting port 62 of the funnel-shaped plate 64. A lower spring 72 is provided beneath the bladder 68, and an upper spring 74 is provided around the gating portion 70. The bladder 68 is made of a thermoplastic resin, etc. to be capable of floating on liquid flowed into the casing 56 thereby to fit the gating portion 70 to the venting port 62.

Preferably, the upper spring 74 provided around the gating portion 70 has a larger diameter than that of the venting port 62. Each of the outlet 58 and inlet 60 may be provided at their circumferential portion with a sill so as to tightly be coupled to the hose 76.

By the counter-current check device 54 of the present invention, constructed as mentioned above, even though liquid flows into the casing 56 through the inlet 60, the liquid is prevented from flowing into the canister 50 by the fact that the gating portion 70 is moved upward due to buoyancy of the bladder 68 when liquid from the inlet 60 acts on the bladder 68 and the gating portion 70 is fitted to the venting port 62 of the funnel-shaped plate 64. During normal operation, the venting port 62 is maintained in an opened state so as to allow an outside air to be flowed into the canister 50. Therefore, the venting port 62 is maintained in a closed state only while an automobile passes through a puddle and/or when a localized torrential downpour drops.

The lower spring 72 positioned below the bladder 68 may have a higher spring constant than the upper spring 74 provided around the gating portion 70. Biasing force of the lower spring 72 may be stronger than that of the upper spring 74 in order to block the venting port 62 by the gating portion 70, i.e., to raise the bladder 68 which tends to descend due to its gravity and the biasing force of the upper spring 74.

While the present invention has been described and illustrated herein with reference to the preferred embodiments thereof, it will be understood by those skilled in the art that various changes in form and details may be made therein without departing from the spirit and scope of the invention.

What is claimed is:

1. A device for preventing liquid from flowing into a canister of an automobile, the device comprising:

a casing of a substantially cylindrical configuration having an inlet and an outlet, said outlet being connected to an atmospheric vent pipe of said canister and said inlet being connected to the atmosphere;

a funnel-shaped plate fastened to an inner surface of said casing and having a venting port formed in a center of the funnel-shaped plate;

a bladder positioned below said funnel-shaped plate, having a gating portion fittable to said venting port of said funnel-shaped plate; and biasing means automatically operative when liquid from the inlet acts on said bladder for urging said gating portion of said bladder against said venting port of said funnel-shaped plate.

2. The device as claimed in claim 1, wherein said biasing means comprises two springs positioned above and below said bladder, respectively.

3. The device as claimed in claim 2, wherein said spring positioned below said bladder has a higher spring constant than said spring provided around said gating portion.

\* \* \* \* \*